US006240406B1

(12) United States Patent
Tannen

(10) Patent No.: US 6,240,406 B1
(45) Date of Patent: May 29, 2001

(54) SYSTEM AND METHOD FOR OPTIMIZING QUERIES WITH AGGREGATES AND COLLECTION CONVERSIONS

(75) Inventor: Val Breazu Tannen, Philadelphia, PA (US)

(73) Assignee: The Trustees of the University of Pennsylvania, Philadelphia, PA (US)

( * ) Notice: Subject to any disclaimer, the term of this patent is extended or adjusted under 35 U.S.C. 154(b) by 0 days.

(21) Appl. No.: 09/144,281

(22) Filed: Aug. 31, 1998

(51) Int. Cl.⁷ .................................................. G06F 17/30

(52) U.S. Cl. .................... 707/2; 707/1; 707/3; 707/4; 707/5; 707/6; 707/7

(58) Field of Search ..................... 707/2, 1, 3, 4, 707/5, 6, 7

(56) References Cited

U.S. PATENT DOCUMENTS

| | | | |
|---|---|---|---|
| 5,313,575 | 5/1994 | Beethe | 345/356 |
| 5,325,465 | 6/1994 | Hung et al. | 706/55 |
| 5,412,718 | 5/1995 | Narasimhalu et al. | 714/797 |
| 5,428,737 | 6/1995 | Li et al. | 707/4 |
| 5,442,778 * | 8/1995 | Pedersen et al. | 707/5 |
| 5,487,132 | 1/1996 | Cheng | 706/45 |
| 5,487,141 | 1/1996 | Cain et al. | 345/435 |
| 5,590,324 * | 12/1996 | Leung et al. | 707/5 |
| 5,701,466 | 12/1997 | Yong et al. | 707/100 |
| 5,727,158 | 3/1998 | Bouziane et al. | 709/225 |
| 5,749,079 | 5/1998 | Yong et al. | 707/100 |
| 5,751,962 | 5/1998 | Fanshier et al. | 709/223 |
| 5,761,493 * | 6/1998 | Blakeley et al. | 707/4 |
| 5,774,692 * | 6/1998 | Boyer et al. | 707/3 |
| 5,819,255 * | 10/1998 | Celis et al. | 707/2 |
| 6,006,214 * | 12/1999 | Carey et al. | 707/2 |
| 6,021,405 * | 2/2000 | Celis et al. | 707/2 |

OTHER PUBLICATIONS

Dynamic optimization of index scans restricted by booleans by Genneady Antoshenkov, Oracle Corporation, pp. 430–440, Feb. 1996.*

The Microsoft relational engine by G. Graefe, Microsoft Corp. Redmond, WA, pp. 1–2, Mar. 1996.*

Lellahi, K. et al., "A Calculus for Collections and Aggregates," Université de Paris 13, Institut Galilée, CIS Dept., Univ. of Pennsylvania, pp. 1–19. (Sep. 4–6 1997).

Davidson, S.B., et al., "BioKleisli: A Digital Library for Biomedical Researchers," Dept. of Computer Information Science & Dept. of Genetics, Univ. of Pennsylvania, Institute of Systems Science, Heng Mui Keng Terrace, Singapore, pp. 1–10, Aug. 12, 1996.

"CBIL bioWidgets for Java," Univ. of Pennsylvania, bioWidgets, pp. 1–9. (1998).

Wong, Limsoon Dr., "The Kleisli System," Kent Ridge Digital Laboratories, 21 Hen Mui Keng Terrace, Singapore, pp. 1–4. (Sep. 20, 1998).

Wong, Limsoon Dr., Strategy of the Kleisli Project, Kent Ridge Digital Laboratories, 21 Heng Mui Keng Terrace, Singapore, pp. 1–4. (Aug. 20, 1998).

Fanshier, S. R. et al., "Object–based Systems Management of Computer Networks," Abstract No. 5751962, www.patents.ibm.com., pp. 1–2. (Dec. 13, 1995).

Beethe, D.C., "Processing Method for An Iconic Programming System," Abstract No. 5313575, www.patents.ibm.com., pp. 1–3. (May 14, 1993).

(List continued on next page.)

Primary Examiner—Thomas Black
Assistant Examiner—Diane D. Mizrahi
(74) Attorney, Agent, or Firm—Finnegan, Henderson, Farabow, Garrett & Dunner, L.L.P.

(57) ABSTRACT

Systems and methods for optimizing database queries involving aggregates identify instantiations of rules in an internal language representation of the original query, and then applies the rules to those instantiations to form an optimized query execution plan.

14 Claims, 4 Drawing Sheets

OTHER PUBLICATIONS

Fah, Low Kwee, et al, "KRDL—Press Releases," Jointly issued by KRDL, NUS, and NTU., pp. 1–3, 1–3. 1–3, KRDL Communications, Jul. 1998.

Wong, L., "The Collection Programming Language," Kent Ridge Digital Labs, 21 Heng Mui Keng Terrace, Singapore, pp. 1–108, Aug. 21, 1998.

Wong, L., "The Kleisli/CPL Extensible Query Optimizer," Institute of Systems Science, Heng Mui Keng Terrace, Singapore, pp. 1–258, Apr. 16, 1996.

Wong, L., "The Kleisli Query System," Institute of Systems Science, Heng Mui Keng Terrace, Singapore, pp. 1–258, Nov. 24, 1997.

* cited by examiner

| C | <u>Loop</u> [C-alg{σ}] (x∈S) R | <u>bin</u> [C-alg{σ}] (S$_1$,S$_2$) | <u>null</u> [C-alg{σ}] |
|---|---|---|---|
| <u>SET</u> | $R_1 \cup \cdots \cup R_n$ | $S_1 \cup S_2$ | empty set |
| <u>BAG</u> | $R_1 \uplus \cdots \uplus R_n$ | $S_1 \uplus S_2$ | empty bag |
| <u>LIST</u> | $R_1 @ \cdots @ R_n$ | $S_1 @ S_2$ | empty list |

*FIG. 3*

| α | <u>Loop</u> [α] (x∈S) e | <u>bin</u> [α] (e$_1$,e$_2$) | <u>null</u> [α] |
|---|---|---|---|
| some | $e_1 \vee \cdots \vee e_n$ | $e_1 \vee e_2$ | false |
| all | $e_1 \wedge \cdots \wedge e_n$ | $e_1 \wedge e_2$ | true |
| max | $max(e_1,\ldots,e_n)$ | $max(e_1, e_2)$ | $-\infty$ |
| min | $min(e_1,\ldots,e_n)$ | $min(e_1, e_2)$ | $+\infty$ |
| sum | $e_1 + \cdots + e_n$ | $e_1 + e_2$ | 0 |
| prod | $e_1 * \cdots * e_n$ | $e_1 * e_2$ | 1 |
| concat | $e_1 \cdots e_n$ | $e_1\ e_2$ | empty string |

*FIG. 4*

$Transl\,(E\,.\,L) \stackrel{\text{def}}{=} Transl\,(E).L$ $Transl\,(\text{STRUCT}\,(\,L1 : E1, \ldots, Ln : En\,)) \stackrel{\text{def}}{=} \text{recd}\{L_1 : Transl\,(E1), \ldots, L_n : Transl\,(En)\}$ $Transl\,(\text{BAG}\,(E1, \ldots, En\,)) \stackrel{\text{def}}{=}$ $\underline{\text{bin}}\,[\underline{\text{BAG}}\text{-alg}\,\{\sigma\}]\,(Transl\,(E1)), \ldots, \underline{\text{bin}}\,[\underline{\text{BAG}}\text{-alg}\{\sigma\}]\,(Transl\,(En), \underline{\text{null}}[\underline{\text{BAG}}\text{-alg}\{\sigma\}]))$ $Transl\,(E1\,\text{UNION}\,E2) \stackrel{\text{def}}{=} \underline{\text{bin}}\,[\underline{\text{SET}}\text{-alg}\,\{\sigma\}]\,(Transl\,(E1), (Transl\,(E2))$ $Transl\,(\text{SUM}\,(E)) \stackrel{\text{def}}{=} \underline{\text{Loop}}[\text{sum}]\,(x \in Transl\,(E))\,x$ $Transl\,(\text{COUNT}\,(E)) \stackrel{\text{def}}{=} \underline{\text{Loop}}[\text{sum}]\,(x \in Transl\,(E))\,1$ $Transl\,(\text{AVG}\,(E)) \stackrel{\text{def}}{=} (\underline{\text{Loop}}[\text{sum}]\,(x \in Transl\,(E))\,x)\,\underline{\text{div}}\,(\underline{\text{Loop}}[\text{sum}]\,(x \in Transl\,(E))\,1)$ $Transl\,(\text{MIN}\,(E)) \stackrel{\text{def}}{=} \underline{\text{Loop}}[\text{min}]\,(x \in Transl\,(E))\,x$ $Transl\,(\text{DISTINCT}\,(E)) \stackrel{\text{def}}{=} \underline{\text{conv}}\,[\underline{\text{BAG}}, \underline{\text{SET}}]\,Transl\,(E)$ $Transl\,(\,[\text{FOR}]\,\text{ALL}\,x\,\text{IN}\,E1 : E2) \stackrel{\text{def}}{=} \underline{\text{Loop}}[\text{all}]\,(x \in Transl\,(E1))\,Transl\,(E2)$ $Transl\,(\,\text{SELECT}\,E0\,\text{FROM}\,E1\,[\text{AS}]\,x1, \ldots, En\,[\text{AS}]\,xn) \stackrel{\text{def}}{=}$ $\underline{\text{Loop}}[\underline{\text{BAG}}\text{-alg}\{\sigma\}]\,(x_1 \in Transl\,(E1)) \ldots \underline{\text{Loop}}[\underline{\text{BAG}}\text{-alg}\{\sigma\}]\,(x_n \in Transl\,(En))\,\underline{\text{sng}}\,[\underline{\text{BAG}}]\,\{Transl\,(E0)\}$

*FIG. 5*

SYSTEM AND METHOD FOR OPTIMIZING QUERIES WITH AGGREGATES AND COLLECTION CONVERSIONS

I. BACKGROUND OF THE INVENTION

The present invention relates generally to database queries and more specifically to aggregate queries.

The design of database query languages has started to benefit from advances in general programming language design. For example, SQL, a common query language, has adopted more referential transparency and compositionality, especially in the versions used for object-relational databases. In addition, a rich and challenging standard language, OQL, has been proposed for object-oriented databases.

As demands for information have become more complex, and as the sizes of databases has increased, queries have become correspondingly complex. Traditional query language compilers directly translate queries written in source language into query execution plans that are then executes against the databases of interest. Doing so often creates plans that consume massive amounts of memory and occupy large amounts of I/O resources. Also, complex queries often require construction of intermediate data structures, which further consumes memory.

The increasing sizes of many databases have made many queries unfeasible without some sort of optimization. Although most compilers for general-purpose programming languages perform some optimizing, they do not generally perform such optimizing for database queries. Moreover, these optimizations are not sound if programs are allowed to diverge or have side-effects. In addition, although some database query language compilers perform optimization, they do not do so for aggregates or conversions, two important functions described in detail below.

II. SUMMARY OF THE INVENTION

To address this deficiency, methods and apparatus consistent with this invention apply certain transformation rules on selected aggregates and conversions to produce a query that is more efficient.

Specifically, a method of optimizing an aggregate query of a database consistent with this invention comprises translating the query into an internal language; identifying in the translated query candidates for optimization; and applying a set of optimization rules to the identified candidates to form a transformed query.

A computer system for optimizing an aggregate query of a database consistent with this invention comprises compiler means for translating the query into an internal language; means for identifying in the translated query candidates for optimization; and means for applying a set of optimization rules to the identified candidates to form a transformed query.

Both the foregoing general description and the following detailed description are exemplary and explanatory only and do not restrict the invention claimed. The accompanying drawings, which are incorporated in and constitute a part of this specification, illustrate some systems and methods consistent with the invention and, together with the description, explain the principles of the invention.

III. BRIEF DESCRIPTION OF THE DRAWINGS

In the drawings,

FIG. 3 is a table showing the functions of certain expressions of an internal language consistent with this invention.

FIG. 4 is another table showing the functions of certain expressions of the internal language consistent with this invention for a SET, BAG, and LIST.

FIG. 5 is a list of transformations, consistent with this invention, from a fragment of OQL to the internal language consistent with this invention.

IV. DETAILED DESCRIPTION OF THE PREFERRED EMBODIMENTS

Reference will now be made to apparatus and methods consistent with this invention, examples of which appear in the following drawings. In general, the same reference numbers in different drawings refer to the same or similar elements. The following description is not intended to limit the scope of the invention, but rather to provide examples of that invention.

A. Overview

Figure 1:
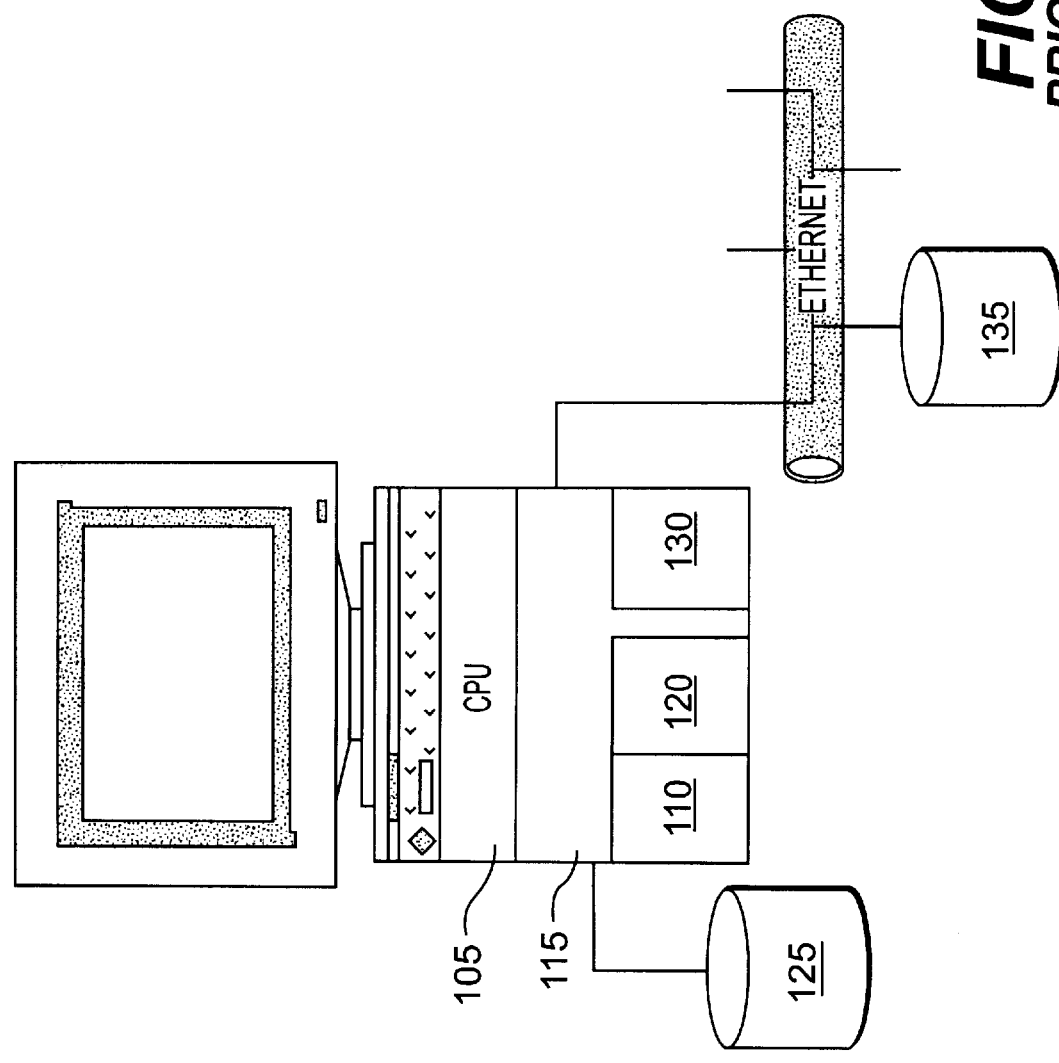
FIG. 1 is a diagram of a computer system and network that can be configured consistent with this invention.

Systems and methods consistent with the present invention optimize database queries involving aggregates. FIG. 1 shows a data processing system 100 with CPU 105 that executes programs to allow a user to query databases, such as databases 110, 120 ... 130, residing in main memory 115, disk 125, or in a network 135. A user would query the databases using a query language, such as SQL or OQL, that CPU 105 would compile or interpret.

Optimizing queries involving aggregates can substantially reduce the overhead of such queries. Optimization consistent with this invention involves identifying certain instantiations of query types and then applying transformation rules to those instantiations to create an optimized query execution plan. Executing the optimized plan produces the same results as a nonoptimized plan, but uses fewer resources than the nonoptimized plan.

The methodology consistent with this invention captures aspects encompassing the relational data model, the nested relational paradigm, and many features of object-relational and object-oriented data models. Specifically, it captures the principles of optimized programming with collections and their aggregates in an economical formalism that is suitable for study using the tools of the programming semantics community. In addition, the methodology uses a theory of enriched monads that provides a semantic foundation for the underlying theory. The methodology encompasses a new role for monad algebras and monad morphisms in programming semantics, as well as an interesting connection with interchange laws.

B. Definitions

The following description uses several terms known to programmers in this field. For clarity, however, this description begins with certain definitions.

Collections and aggregates are essential components of the basic database models. Collections are data such as lists, sets, bags (multisets), trees. Specifically, collections include data types such as homogenous, finite sets, bags, lists, and trees with data on the leaves. There are always collections of one element, called "singletons." Coll X denotes the set of finite collections of a certain kind made out of elements in X.

More formally, an algebraic collection type is a parameterized type that admits an inductive definition of the following form (in ML-like syntax):

$$\text{datatype 'a Coll=sng of'a}|\text{opcoll of'a Coll* ... *'a Coll}| ...$$

with one or more finitary algebraic operations of various "arities" (including nullary) on collections as constructors (in addition to singletons). Moreover, the meaning of such types can be further constrained by equations between the algebraic constructors.

Aggregates are functions on collections, such as adding all the elements of a bag of integers or returning the largest number in a set. Aggregates are operations of the form agg: Coll A→A, which compute an element of A out each collection of elements of A. The aggregate of a singleton must, of course, equal its only element. Examples of aggregates for which systems and methods of this invention are useful include $\quad agg_{or}, agg_{and}$: Set bool→bool, $\quad agg_{max}, agg_{min}$: Set num→num for the Set data type $\quad agg_{sum}$: Bag num→num for Bag, and $\quad agg_{concat}$: list string→string for List.

A monad is a parameterized abstract data type. A monad on Base is given by a functor Base→Base, whose action on objects we denote by $X \to \text{Coll } X$ and whose action on morphisms we denote, instead of the usual Coll $f$, by f: $X \to Y \to \text{map } f$: Coll $X \to$ Coll Y and two natural transformations, sng$_X$: $X \to$ Coll X and flatten$_X$: Coll Coll $X \to$ Coll X such that:

$$flatten_X o(map\ sng_X) = id_{Coll\ X} \quad (1)$$

$$flatten_X o\ sng_{CollX} = id_{Coll\ X} \quad (2)$$

$$flatten_X o(map\ flatten_X) = flatten_X o\ flatten_{CollX} \quad (3)$$

For example, Coll X is the set of finite sets (bags, lists, compact binary trees, binary trees, ternary trees, "2–3 trees," etc.) with elements from X.sng builds a singleton set (bag, etc.), map $f$ applies $f$ to each element of a set, and flatten is the union of a set of sets. We denote the first three of these monads by Set, Bag, and List.

If (Coll, map, sng, flatten) is a monad, a monad algebra for the monad Coll is a Coll-algebra (definition 1) (A, agg$_A$: Coll A→A) such that $$agg_A o\ sng_A = id_A \quad (10)$$

$$agg_A o(map\ agg_A) = agg_A o\ flatten_A \quad (11)$$

Disjunction, conjunction, max, and min aggregation are monad algebras for Bag and List and sum aggregation is also a monad algebra for List, but sum aggregation is not a monad algebra for Set.

Greater details on these terms, as well as a mathematical treatment of some of the issues involved, appear in *A Calculus for Collections and Aggregates*, Lellahi, Kazem and Tannen, Val, Category Theory and Computer Science, 7th International Conference CTCS '97, Santa Margherita, Ligure, Italy, September 1997 Proceedings, Lecture Notes in Computer Science Vol. 1290 (Springer Verlag).

C. Optimization

Figure 2:
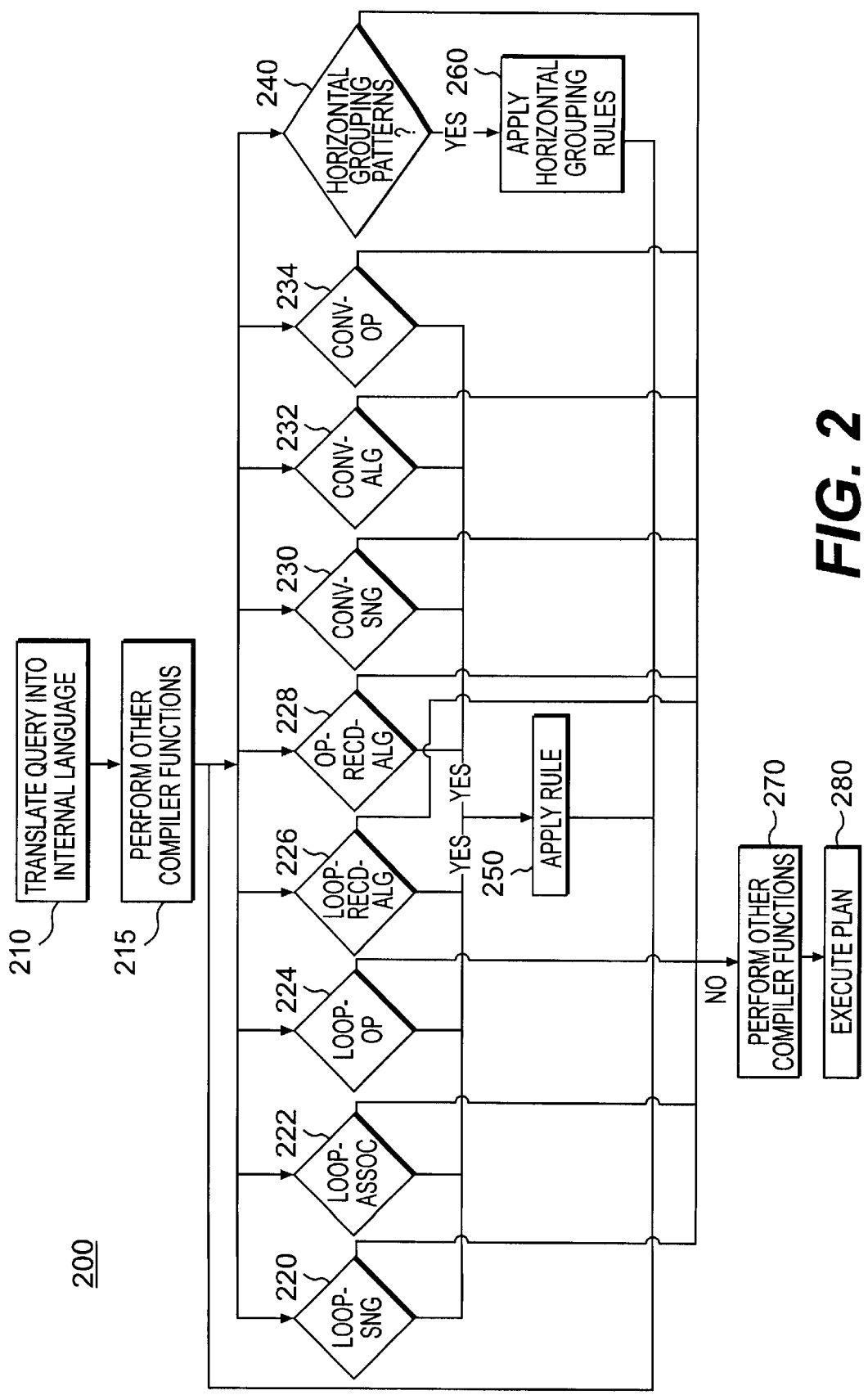
FIG. 2 is a flowchart of operations of an optimizing compiler and portions of an operating system consistent with this invention.

FIG. 2 shows a flowchart 200 for a method of optimization consistent with this invention. Flowchart 200 ignores many standard operations that a query language compiler performs standard operations on a query written in a source query language, such as OQL or SQL, and calls steps in the procedure represented by flowchart 200 for optimization.

Initially, the compiler translates the query from the source query language into an internal language (step 210). The internal language should have certain collections, types, algebra, and expressions. The meaning of its collections must form a monad, and the meaning of its algebra must form a monad algebra.

Specifically, the term "collection," C, is conventional, and most likely will be a SET, BAG, or LIST in database queries. A SET has only one occurrence of each element, and BAG or MULTISET can have multiple occurrences. A LIST is an ordered BAG.

The internal language also has at least three "types." The BASIC-TYPE is also conventional, and will most likely be "bool" (boolean), "num" (numeric), or string. A COLL-TYPE is denoted as C $\{\sigma\}$, and RECD-TYPE is denoted as RECD $\{L_1: \alpha_1, \ldots, L_n: \alpha_n\}$.

In addition, the internal language has at least three algebras. The BASIC-ALG supports various conventional functions such as "some," "all," "max," "min," "prod," and "concat," which are various functions in OQL, and which will be explained after the discussion of expressions. FREE is denoted as C-alg $\{\sigma\}$, and RECD-TYPE is denoted as RECD-ALG $\{L_1: \alpha_1, \ldots, L_n: \alpha_n\}$. The "some," "all," "max,' and "min" functions work with SET, the "sum" and "prod" functions work with BAG, and the "concat" function works with LIST. C-alg $\{\sigma\}$ works with C, and if $\alpha_1$ works with C, ..., $\alpha_n$, works with C, then RECD-alg $\{L_1: \alpha_1, \ldots, L_n: \alpha_n\}$ also works with C.

These expression-building elements contain collection element COLL and algebra-building elements FREE, RECD-ALG, and BASIC-ALG. Moreover, FREE contains type-building elements COLL-TYPE, RECD-TYPE and BASIC-TYPE such as the examples given above.

Each monad algebra corresponds to (works with) some monad (i.e., each algebra works with a collection), and the previous discussion shows how to determine the collection that corresponds to each of the algebras.

In addition, the expressions include the following:

| | | |
|---|---|---|
| SNG | sng [C]{e} | Collection C has a single value e (singleton) |
| LOOP | Loop [α](x∈e$_1$)e$_2$ | Apply function α while looping through the values of e$_1$ (arbitrary number of operands) |
| OP | op [α]{e$_1$, . . . , e$_m$} | Perform function α on e$_1$, . . . , e$_m$ (fixed number of operands) |
| BIN | bin [α]{e$_1$,e$_2$} | Perform function α on e$_1$ and e$_2$ |
| NULL | null [α] | Perform the null of function α |
| CONV | conv [C$_1$,C$_1$]e | Convert C$_1$ to type e and store in C$_2$ |
| RECD | recd{L$_1$: e$_1$, . . . , L$_n$: e$_n$} | The record has labels L$_1$–L$_n$ corresponding to e$_1$–e$_n$ |
| DOT | e.L | The L component of record e |
| LET | let x= e$_1$ in e$_2$ | Set x to e$_1$ in e$_2$ |

BIN and NULL can be considered examples of OP.

FIG. 3 shows the functions of the BASIC-ALG for the LOOP, BIN and NULL expressions. In FIG. 3, ∨ is a logical "OR"; ∧ is a logical "AND"; and e$_1$ e$_2$ is the juxtaposition of strings e$_1$ and e$_2$.

FIG. 4 shows the LOOP, BIN and NULL expression for a SET, BAG, and LIST. The operator ⊎ is the union of bags, adding the number of occurrences, and @ is a list-append.

After transforming the query into the internal language, the compiler performs conventional functions (step 215), and then it transforms the query by applying the appropriate rules of transformation. Returning to FIG. 2, the optimizer traverses the query to see whether it is appropriate to apply any of the following rules: LOOP-SNG (step 220), LOOP-ASSOC (step 222), LOOP-OP (step 224), LOOP-RECD-ALG (step 226), OP-RECD-ALG (step 228), CONV-SNG (step 230), CONV-ALG (step 232), CONV-OP (step 234), or the horizontal grouping patterns (step 240). The first eight rules are as follows:

| | |
|---|---|
| LOOP-SNG: | $Loop[\alpha](x \in sng[C]\{e_1,\})e_2 \leftarrow e_2[e_1/x]$ |
| LOOP-ASSOC: | $Loop[\alpha](x \in ([C\text{-}alg\{\sigma\}]y \in R)S))e \leftarrow Loop[\alpha](y \in R)$ $(Loop[\alpha](x \in S)e)$ |
| LOOP-OP: | $Loop[\alpha](x \in op[C\text{-}alg\{\sigma\}]\{S_1, \ldots, S_m\})e \leftarrow$ $op\ [\alpha]\{Loop\ [\alpha](x \in S_1)e \ldots,$ $Loop[\alpha](x \in S_2)e\}$ |
| LOOP-RECD-ALG: | $recd\{L_1: Loop[\alpha_1](x \in S)e_1, \ldots, L_n: Loop[\alpha_n](x \in S)e_n\} \leftarrow$ $Loop[RECD\text{-}ALG\{L_1: \alpha_1 \ldots, L_n: \alpha_n\}](x \in S)$ $recd\ \{L_1: \alpha_1 \ldots, L_n: \alpha_n\}$ |
| OP-RECD-ALG: | $op[RECD\text{-}alg\{L_1: \alpha_1 \ldots, L_n: \alpha_n\}]\{recd\ \{L_1: e_{11}, \ldots,$ $L_n: e_{1n}\}, \ldots, recd\ \{L_1: e_{m1} \ldots, L_n: e_{mn}\}\} \leftarrow$ $recd\{L_1: op[\alpha_1]\{e_{11}, \ldots, e_{m1}\}, \ldots, L_n: op[\alpha_1]\{e_{n1}, \ldots, e_{mn}\}\}$ |
| CONV-SNG | $conv\ [C_1, C_2](sng[C_1]\{e\}) \leftarrow sng[C_2]\{e\}$ |
| CONV-ALG | $conv\ [C_1, C_2](Loop[C_1\text{-}alg\{\sigma\}](x \in S)R) \leftarrow$ $Loop[C_2\text{-}alg\{\sigma\}](x \in (conv\ [C_1, C_2]S))(conv\ [C_1, C_2]R)$ |
| CONV-OP | $conv\ [C_1, C_2](Loop[C_1\text{-}alg\{\sigma\}]\{S_1, \ldots, S_m\}) \leftarrow$ $op\ [C_2\text{-}alg\{\sigma\}]\{conv\ [C_1, C_2]S_1, \ldots, conv\ [C_1, C_2]S_m\}$ |

Of these, the first five rules, LOOP-SNG, LOOP-ASSOC, LOOP-OP, LOOP-RECD-ALG, and OP-RECD-ALG, are transformation rules for expressions involving aggregates. The LOOP-SNG rule avoids having to execute loop processes on singletons by substituting all occurrences of the variable x with $e_2$ within $e_1$. The LOOP-ASSOC rule accomplishes vertical loop fusing when there is a loop expression over a monad algebra, and eliminates that loop expression, which in turn avoids the need of creating intermediate collections. This is particularly beneficial because intermediate collections are computationally expensive and consume additional memory. The LOOP-OP rule provides similar optimizations. The LOOP-RECD-ALG rule fuses n loops into one loop, thereby reducing computation time. The OP-RECD-ALG rule is used because applying the LOOP-OP rule produces OP [α] expressions, and if α is a RECD-ALG, the OP-RECD-ALG rule further transforms the result into other records.

The next three rules, CONV-SNG, CONV-ALG, CONV-OP are transformation rules for expressions involving collection conversions. The CONV-SNG rule eliminates a conv function for singletons. The CONV-ALG and CONV-OP rules move the Loop and op, respectively, out of the conv function.

Rules LOOP-SNG, LOOP-ASSOC, LOOP-RECD-ALG can be used for any collections whose meaning satisfies the mathematical definition of monads (such as finite sets, finite multisets (bags), and finite lists), and for any algebra whose meaning satisfies the mathematical definition of monad algebras (such as disjunction and conjunction of finite sets of booleans, max and min of finite sets of numbers, sum and product of finite bags of numbers, and concatenation of finite lists of strings). Rules CONV-SNG and CONV-LOOP can be used for any pair of collections whose meanings are monads between which there exists a monad morphism (such as list to bag, bag to set, list to set). Rule LOOP-OP can be used for any collection whose meaning is a monad enriched with one or more algebraic operations (such as sets with the binary operation union and the nullary operation empty set, bags with binary bag-union and nullary empty bag, and lists with binary append and nullary empty list). Rule CONV-OP can be used for any pair of collections whose meanings are monads between which there exists a monad morphism which commutes with the enrichments (such as list to bag with append/bag-union and empty list/empty bag, etc.).

When a rule applies, the transformation is implemented (step 250). In a preferred implementation, the optimizer determines whether query Q, expressed in the internal language, contains a query subexpression L' that matches the left-hand side, L, of any of the rules above, such that L' is an instantiation of L. If so, then the rule is applicable to Q. The optimizer then performs the corresponding transformation by replacing L' with R', which is the instantiation of R, the right-hand side of the rule that corresponds to the instantiation of L to L'. In some cases, using a rule from right to left is also useful, so R above plays the role of L and conversely L plays the role of R.

The purpose of the horizontal grouping patterns to increase the number of applications of the rule LOOP-RECD-ALG (step 240). These "horizontal grouping" patterns apply to query expressions in the internal language that have two or more subexpressions consisting of the LOOP element ranging over the same subexpression.

If the patterns are located, then horizontal grouping rules are applied (step 260). Specifically, in such situations, the rule HORIZ-GROUP is applied first, followed by the rule LOOP-RECD-ALG, followed by LET and PROJ functions. The HORIZ-GROUP rule and the LET and PROJ functions are shown below:

| | |
|---|---|
| HORIZ-GROUP | $[\ldots Loop[\alpha_1](x \in S)e_1 \ldots Loop[\alpha_n](x \in S)e_n \ldots] \leftarrow$ $let\ x = recd\{L_1: Loop[\alpha_1](x \in S)e_1 \ldots L_n: Loop[\alpha_n](x \in S)e_n\ in$ $[\ldots z.L_1 \ldots z.L_1 \ldots]$ |
| LET | $let\ x = e_1\ in\ e_2 \leftarrow e_2[e_1/x]$ |
| PROJ | $recd\{L_1:e_1 \ldots L_n:e_n\}.L_1 \leftarrow e_1$ |

The horizontal grouping is useful if there are several places in the query where there is a loop for collection S. This rule creates a record z with those loops, and allows the loops to execute on S fewer times. The LET rule performs substitutions, and the PROJ rule extracts expressions from records when the DOT function exists.

After each transformation (steps 250, 260), the query is tested again for occurrences of the rules. When no more rules can be applied to the query, and there are no more horizontal grouping patterns, the transformed query is optimized and forms a query execution plan. After the compiler performs other conventional functions (step 270), a database execution engine executes the query execution plan on the desired database or databases (step 280).

The term "optimized," is not intended to imply that the resulting query execution plan is the absolute most efficient, or the absolute fastest plan. The term "optirmized" merely means that the query has taken advantage of the rules provided to increase the efficiency of the original query.

FIG. 5 shows translations from a fragment of OQL to the internal language. The OQL elements for which we give the translation are:

E.L
STRUCT (L1: E1, ... , Ln: En)
BAG (E1, ... , En)
SELECT E0 FROM E1 [AS] x1, ... , En [AS] xn
E1 UNION E2
SUM (E)
COUNT (E)
AVG (E)
MIN (E)
[FOR] ALL x IN E1: E2
DISTINCT (E)

The translations given assume that the expressions typecheck correctly. There are, of course, typing rules for the internal language as well as for OQL and persons of ordinary skill will understand that the examples given only use type-correct expressions. The typing rules of OQL also allow some flexibility in certain collection constructs and some conversions from lists to bags to sets or even sets to bags are implicit.

D. Conclusion

As the foregoing explanation shows, methods and apparatus consistent with this invention can improve the efficiency of queries involving aggregate functions and conversions. The invention is not, however, limited to the specific embodiments described above. For example, the rules may be searched for and applied in different orders than those shown above. Alternatively, other rules can be used, and not all of the rules shown above need be implemented. Persons of ordinary skill will be able to construct other systems that fall within the scope of the appended claims, and it is intended that the claims below define the invention.

What is claimed is:

1. A method of optimizing a query of a database comprising
   translating the query into an internal language;
   identifying, in the translated query, candidates for optimization; and
   applying a set of optimization rules to the identified candidates to form a transformed query;
   where the query comprises an operation selected from the group consisting of aggregate operations and collection conversion operations; and
   where the identified candidates comprise a translation of the operation selected from the group consisting of aggregate operations and collection conversion operations.

2. The method of claim 1, wherein
   identifying candidates for optimization includes
      identifying one candidate for optimization, wherein
   applying a set of optimization rules includes
      applying the one of the set of optimization rules corresponding to the identified candidate, and
   further including
      repeating the identifying and applying operations until no other candidates can be identified.

3. The method of claim 1 wherein
   identifying candidates for optimization includes
      looking for predetermined patterns, and wherein
   applying a set of optimization rules includes
      applying a set of rules corresponding to the pattern.

4. The method of claim 3, wherein looking for predetermined patterns includes
   looking for horizontal grouping patterns.

5. The method of claim 1, wherein the step of identifying query candidates includes
   identifying a loop singleton instance.

6. The method of claim 1, wherein the step of identifying query candidates includes
   identifying a loop associate instance.

7. The method of claim 1, wherein the step of identifying query candidates includes
   identifying a loop operation instance.

8. The method of claim 1, wherein the step of identifying query candidates includes
   identifying a loop record algebra instance.

9. The method of claim 1, wherein the step of identifying query candidates includes
   identifying an operation record algebra instance.

10. The method of claim 1, wherein the step of identifying query candidates includes
    identifying a convert singleton instance.

11. The method of claim 1, wherein the step of identifying query candidates includes
    identifying a convert algebra instance.

12. The method of claim 1, wherein the step of identifying query candidates includes
    identifying a convert operation instance.

13. A computer system optimizing a query of a database comprising:
    compiler means for translating the query into an internal language;
    means for identifying, in the translated query, candidates for optimization; and
    means for applying a set of optimization rules to the identified candidates to form a transformed query;
    where the query comprises an operation selected from the group consisting of aggregate operations and collection conversion operations; and
    where the identified candidates comprise a translation of the operation selected from the group consisting of aggregate operations and collection conversion operations.

14. The computer system of claim 13, wherein the
    means for identifying candidates for optimization includes
       means for identifying one candidate for optimization, wherein the means for applying a set of optimization rules includes
       means for applying the one of the set of optimization rules corresponding to the identified candidate, and
    further including
       means for activating the identifying means and the applying means until no other candidates can be identified.

* * * * *